(12) United States Patent
Hiraga et al.

(10) Patent No.: US 11,720,788 B2
(45) Date of Patent: Aug. 8, 2023

(54) CALCULATION SCHEME DECISION SYSTEM, CALCULATION SCHEME DECISION DEVICE, CALCULATION SCHEME DECISION METHOD, AND STORAGE MEDIUM

(71) Applicant: Morpho, Inc., Tokyo (JP)

(72) Inventors: Masaki Hiraga, Tokyo (JP); Yasuhiro Kuroda, Tokyo (JP); Hitoshi Matsuo, Tokyo (JP); Hideaki Nishino, Tokyo (JP); Kouta Kurihara, Tokyo (JP)

(73) Assignee: Morpho Inc., Tokyo (JP)

( * ) Notice: Subject to any disclaimer, the term of this patent is extended or adjusted under 35 U.S.C. 154(b) by 836 days.

(21) Appl. No.: 16/617,175

(22) PCT Filed: Jan. 23, 2019

(86) PCT No.: PCT/JP2019/002103
§ 371 (c)(1),
(2) Date: Nov. 26, 2019

(87) PCT Pub. No.: WO2019/146651
PCT Pub. Date: Aug. 1, 2019

(65) Prior Publication Data
US 2021/0158136 A1 May 27, 2021

(30) Foreign Application Priority Data
Jan. 25, 2018 (JP) ................. 2018-010681

(51) Int. Cl.
*G06N 3/08* (2023.01)
*G06N 3/04* (2023.01)
(Continued)

(52) U.S. Cl.
CPC .............. *G06N 3/08* (2013.01); *G06N 3/04* (2013.01)

(58) Field of Classification Search
CPC ............................. H04L 1/0038; H04L 45/02
See application file for complete search history.

(56) References Cited

U.S. PATENT DOCUMENTS 10,872,038 B1 * 12/2020 Nair .................... G06F 9/30036
11,113,771 B1 *  9/2021 Wang .................. G06F 16/9024
(Continued)

FOREIGN PATENT DOCUMENTS

| CA | 2 987 325 A1 | 7/2017 |
| CN | 101707788 A | 5/2010 |

(Continued)

OTHER PUBLICATIONS

International Preliminary Report on Patentability dated Aug. 6, 2020 from the International Bureau in International Application No. PCT/JP2019/002103.
(Continued)

*Primary Examiner* — Getente A Yimer
(74) *Attorney, Agent, or Firm* — Sughrue Mion, PLLC

(57) ABSTRACT

A calculation scheme decision system includes a pre-calculation unit performing, in an execution environment in which calculation is performed, calculation for each of respective layers of the network structure using at least one of calculation schemes prepared in advance for the respective layers, a cost acquisition unit acquiring a calculation cost of at least one calculation scheme for each layer based on a result of the calculation by the pre-calculation unit, a decision unit selecting one calculation scheme for each layer based on the calculation cost from among at least one of the calculation schemes prepared in advance for the respective layers to associate the layer with the selected one calculation scheme, and a calculation unit performing the calculation for each of the respective layers of the network structure on
(Continued)

input data in the execution environment using the calculation scheme associated with each layer.

13 Claims, 14 Drawing Sheets

(51) Int. Cl.
*G06N 3/063* (2023.01)
*G06N 3/10* (2006.01)

(56) References Cited

U.S. PATENT DOCUMENTS

| | | | |
|---|---|---|---|
| 11,212,600 B2* | 12/2021 | Doo | H04J 14/08 |
| 11,365,963 B2* | 6/2022 | Chaudhury | G01B 9/02041 |
| 2004/0081260 A1* | 4/2004 | Matsusaka | H04L 1/0038 |
| | | | 375/340 |
| 2010/0208722 A1* | 8/2010 | Nishioka | H04L 45/02 |
| | | | 370/351 |
| 2022/0207361 A1* | 6/2022 | Pang | G06N 3/0454 |

FOREIGN PATENT DOCUMENTS

| | | |
|---|---|---|
| CN | 106875013 A | 6/2017 |
| CN | 107169560 A | 9/2017 |
| JP | 2000-105743 A | 4/2000 |
| JP | 2011-164864 A | 8/2011 |
| JP | 2016-157426 A | 9/2016 |
| WO | 2012/101863 A1 | 8/2012 |

OTHER PUBLICATIONS

Xinyu Zhang et al., "A Design Methodology for Efficient Implementation of Deconvolutional Neural Networks on an FPGA", arxiv.org, Cornell University Library, 201 Olin Library Cornell University, Ithaca, NY, May 7, 2017, (7 pages total).
Andre Xian Ming Chang et al., "Compiling Deep Learning Models for Custom Hardware Accelerators", arxiv.org, Cornell University Library, 201 Olin Library Cornell University, Ithaca, NY, Aug. 1, 2017, (8 pages total).
Communication dated Dec. 21, 2020, from the European Patent Office in application No. 19743124.0.
Nicholas D. Lane et al., "DeepX: A software accelerator for low-power deep learning inference on mobile devices", 2016 15th ACM/IEEE International Conference on Information Processing in Sensor Networks (IPSN), Apr. 28, 2016, pp. 1-2.
International Search Report for PCT/JP2019/002103 dated Apr. 9, 2019 [PCT/ISA/210].
Office Action dated Sep. 5, 2022 from the Chinese Patent Office in Application No. 201980002589.X.
Office Action dated Dec. 7, 2022 from the European Patent Office in Application No. 19 743 124.0.
Search Report dated Aug. 30, 2020 issued by the Chinese Patent Office in Application No. 201980002589.X.

* cited by examiner

CALCULATION SCHEME DECISION SYSTEM, CALCULATION SCHEME DECISION DEVICE, CALCULATION SCHEME DECISION METHOD, AND STORAGE MEDIUM

CROSS REFERENCE TO RELATED APPLICATIONS

This application is a National Stage of Application No. PCT/JP2019/002103 filed Jan. 23, 2019, claiming priority based on Japanese Patent Application No. 2018-010681 filed Jan. 25, 2018, the disclosure of which is incorporated herein in its entirety by reference.

TECHNICAL FIELD

The present disclosure relates to a calculation scheme decision system, a calculation scheme decision device, a processing device, a calculation scheme decision method, a processing method, a calculation scheme decision program, and a processing program.

BACKGROUND ART

Patent Document 1 discloses a recognition device having a hierarchical network including a plurality of layers of an input layer, a middle layer, and an output layer. The recognition device performs recognition using a network structure and weight data trained by a training device.

CITATION LIST

Patent Document

Patent Document 1: Japanese Laid-open Patent Publication No. 2016-157426

SUMMARY OF INVENTION

Technical Problem

In general, a recognition device may be equipment such as a mobile terminal or a camera which is reduced in size but lower in a processing capability as compared with a training device. As an image sensor is enhanced in performance and a capacity for communication data is increased, a processing time for input data and a resource required for processing tend to increase in the recognition device.

In this technical field, as for a device performing calculation for processing input data using a network structure and weight data, there is a demand for a calculation scheme decision system, a calculation scheme decision device, a processing device, a calculation scheme decision method, a processing method, a calculation scheme decision program, and a processing program which are capable of deciding a calculation scheme taking into account a calculation cost.

Solution to Problem

An aspect of the present disclosure is a calculation scheme decision system including a pre-calculation unit configured to perform, in an execution environment in which calculation for processing input data is performed using a network structure and weight data, calculation for each of respective layers of the network structure on predetermined data using at least one of calculation schemes prepared in advance for the respective layers of the network structure, a cost acquisition unit configured to acquire a calculation cost of the at least one calculation scheme for each of the respective layers of the network structure based on a result of the calculation by the pre-calculation unit, a decision unit configured to select one calculation scheme for each of the respective layers of the network structure based on the calculation cost from among the at least one of the calculation schemes prepared in advance for the respective layers to associate the layer of the network structure with the selected one calculation scheme, and a calculation unit configured to perform the calculation for each of the respective layers of the network structure on the input data in the execution environment using the calculation scheme associated with each layer of the network structure by the decision unit.

In the calculation scheme decision system, one calculation scheme is selected for each layer, from among the calculation schemes prepared in advance, based on the calculation cost obtained by actually operating those calculation schemes in the execution environment. In this way, the calculation scheme decision system can take into account the calculation cost to decide an optimal calculation scheme for each layer. Therefore, the calculation scheme decision system can take into account the calculation cost to decide the calculation scheme.

In an embodiment, the at least one calculation scheme may include a plurality of algorithms executable in the execution environment and exerting the same function using arithmetic operations different from each other. In this case, the calculation scheme decision system can actually operate, in the execution environment, a plurality of algorithms which output the same results but are different from each other in the arithmetic operation method, and decide an optimal algorithm based on the obtained calculation costs.

In an embodiment, at least one calculation scheme may include a plurality of algorithms executable in the execution environment and performing the same arithmetic operation using resources different from each other. In this case, the calculation scheme decision system can actually operate, in the execution environment, a plurality of algorithms which use the same arithmetic operation and output the same results but are different from each other in the usage resource, and decide an optimal algorithm based on the obtained calculation costs.

In an embodiment, the calculation scheme decision system may further include a candidate decision unit configured to prepare the at least one calculation scheme for each of the respective layers of the network structure based on the execution environment. In this case, the calculation scheme decision system can prepare the calculation scheme taking into account the resources in the execution environment.

In an embodiment, the calculation scheme decision system may include a conversion unit configured to acquire the network structure and the weight data from an external device and convert the acquired network structure and weight data into a predetermined format. In this case, the calculation scheme decision system can deal with the training result of the external device in the predetermined format.

In an embodiment, the calculation scheme decision system may further include a first adjustment unit configured to change a data order of the weight data based on the execution environment, wherein the pre-calculation unit and the calculation unit perform calculation based on the weight data adjusted by the first adjustment unit. In this case, the calculation scheme decision system can change the data array of the weight data such that the data becomes a state of being easy to be placed on a cache.

In an embodiment, the calculation scheme decision system may further include a second adjustment unit configured to perform a preprocess related to the calculation of the calculation unit on the weight data, wherein the pre-calculation unit and the calculation unit perform calculation based on the weight data adjusted by the second adjustment unit. In this case, the calculation scheme decision system can reduce a calculation load on the calculation unit.

In an embodiment, the pre-calculation unit and the calculation unit are included in a first terminal, and the calculation scheme decision system may further include a provision unit configured to provide the calculation scheme decided by the decision unit to a second terminal having an execution environment the same as an execution environment of the first terminal. In this case, the calculation scheme decision system can, without calculating in a terminal in the same environment, apply the calculation scheme decided in another terminal having the same environment.

Another aspect of the present disclosure is a calculation scheme decision device including a data acquisition unit configured to acquire, from a processing device in which calculation for processing input data is performed using a network structure and weight data, a calculation cost in a case of calculating, for each of respective layers of the network structure, in at least one of calculation schemes prepared in advance for the respective layers of the network structure, and a decision unit configured to select one calculation scheme for each of the respective layers of the network structure based on the calculation cost from among the at least one of the calculation schemes prepared in advance for the respective layers to associate the layer of the network structure with the selected one calculation scheme.

The calculation scheme decision device can take into account the calculation cost to decide an optimal calculation scheme for each layer. Therefore, the calculation scheme decision device can take into account the calculation cost to change the calculation scheme.

Another aspect of the present disclosure is a processing device including an acquisition unit configured to acquire a network structure, weight data, and a correspondence relation between the layer of the network structure and a calculation scheme, and a calculation unit configured to perform calculation for each of respective layers of the network structure on input data based on the network structure, the weight data, and the correspondence relation acquired by the acquisition unit.

The processing device, in performing the calculation for each of the respective layers of the network structure on the input data, can change the calculation scheme for each layer.

Another aspect of the present disclosure is a calculation scheme decision method including performing, in an execution environment in which calculation for processing input data is performed using a network structure and weight data, calculation for each of respective layers of the network structure on predetermined data using at least one of calculation schemes prepared in advance for the respective layers of the network structure, acquiring a calculation cost of the at least one calculation scheme for each of the respective layers of the network structure based on a result of the calculation for each of the respective layers of the network structure, selecting one calculation scheme for each of the respective layers of the network structure based on the calculation cost from among the at least one of the calculation schemes prepared in advance for the respective layers to associate the layer of the network structure with the selected one calculation scheme, and performing the calculation for each of the respective layers of the network structure on the input data in the execution environment using the calculation scheme associated with each layer of the network structure.

The calculation scheme decision method exerts the same effect as the calculation scheme decision system described above.

Another aspect of the present disclosure is a calculation scheme decision method including acquiring, from a processing device in which calculation for processing input data is performed using a network structure and weight data, a calculation cost in a case of calculating, for each of respective layers of the network structure, in at least one of calculation schemes prepared in advance for the respective layers of the network structure, and selecting one calculation scheme for each of the respective layers of the network structure based on the calculation cost from among the at least one of the calculation schemes prepared in advance for the respective layers to associate the layer of the network structure with the selected one calculation scheme.

The calculation scheme decision method exerts the same effect as the calculation scheme decision device described above.

Another aspect of the present disclosure is a processing method including acquiring a network structure, weight data, and a correspondence relation between a layer of a network structure and a calculation scheme, and performing calculation for each of respective layers of the network structure on input data based on the network structure, the weight data, and the correspondence relation.

The processing method exerts the same effect as the processing device described above.

Another aspect of the present disclosure is a calculation scheme decision program causing a computer to operate. The calculation scheme decision program causes the computer to function as a pre-calculation unit configured to perform, in an execution environment in which calculation for processing input data is performed using a network structure and weight data, calculation for each of respective layers of the network structure on predetermined data using at least one of calculation schemes prepared in advance for the respective layers of the network structure, a cost acquisition unit configured to acquire a calculation cost of the at least one calculation scheme for each of the respective layers of the network structure based on a result of the calculation by the pre-calculation unit, a decision unit configured to select one calculation scheme for each of the respective layers of the network structure based on the calculation cost from among the at least one of the calculation schemes prepared in advance for the respective layers to associate the layer of the network structure with the selected one calculation scheme, and a calculation unit configured to perform the calculation for each of the respective layers of the network structure on the input data in the execution environment using the calculation scheme associated with each layer of the network structure by the decision unit.

The calculation scheme decision program exerts the same effect as the calculation scheme decision system described above.

Another aspect of the present disclosure is a calculation scheme decision program causing a computer to operate. The calculation scheme decision program causes the computer to function as a data acquisition unit configured to acquire, from a processing device in which calculation for processing input data is performed using a network structure and weight data, a calculation cost in a case of calculating, for each of respective layers of the network structure, in at least one of calculation schemes prepared in advance for the respective layers of the network structure, and a decision unit configured to select one calculation scheme for each of the respective layers of the network structure based on the calculation cost from among the at least one of the calculation schemes prepared in advance for the respective layers to associate the layer of the network structure with the selected one calculation scheme.

The calculation scheme decision program exerts the same effect as the calculation scheme decision device described above.

Another aspect of the present disclosure is a processing program causing a computer to operate. The processing program causes the computer to function as an acquisition unit configured to acquire a network structure, weight data, and a correspondence relation between a layer of a network structure and a calculation scheme, and a calculation unit configured to perform calculation for each of respective layers of the network structure on input data based on the network structure, the weight data, and the correspondence relation acquired by the acquisition unit.

The processing program exerts the same effect as the processing device described above.

Advantageous Effects of Invention

According to various aspects of the present disclosure, it is possible to change a calculation scheme taking into account a calculation cost in a device performing calculation for processing input data using a network structure and weight data.

DESCRIPTION OF EMBODIMENTS

Figure 1:
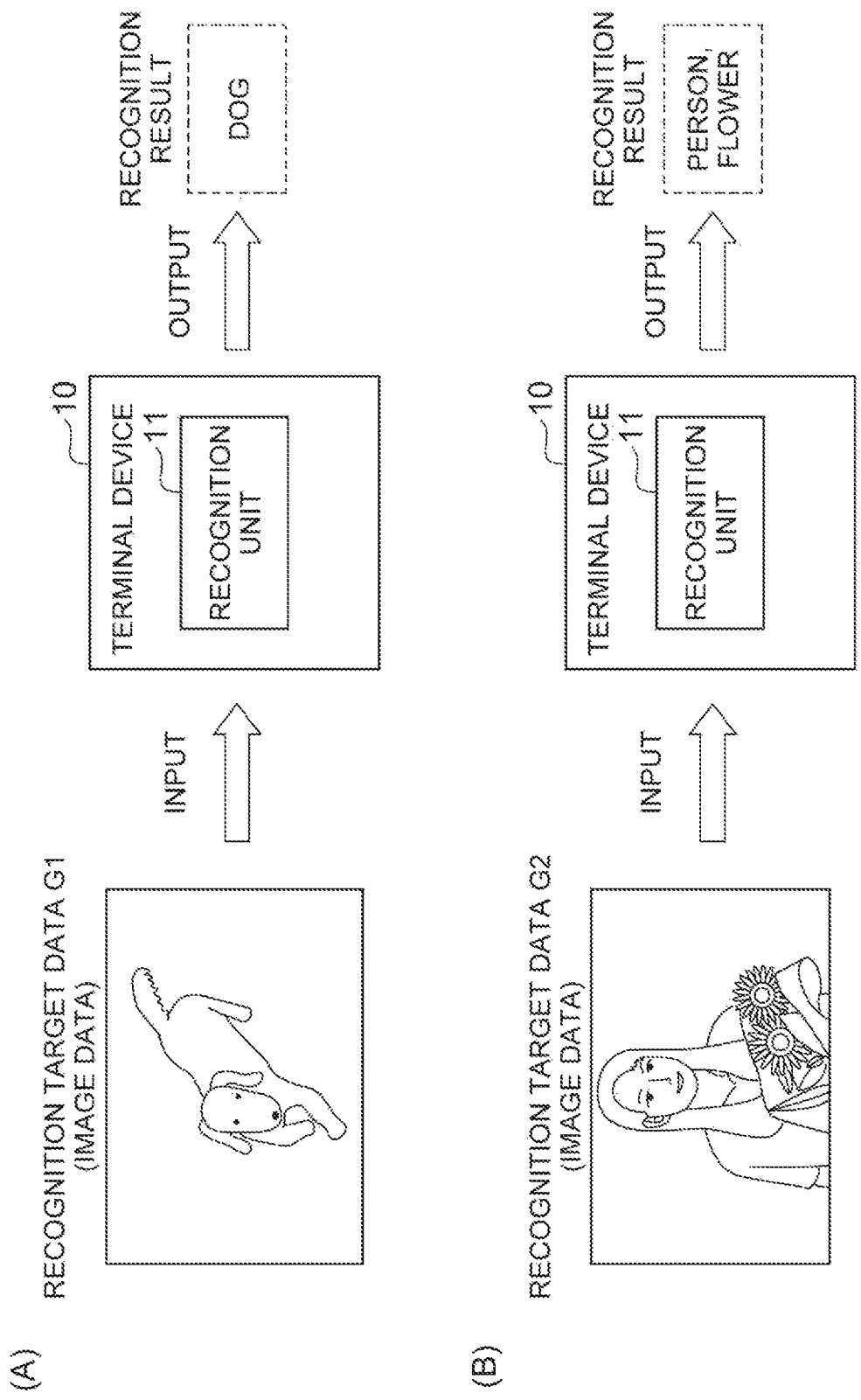
FIG. 1 is a diagram illustrating a recognition unit.

Hereinafter, a description is given of embodiments with reference to the drawings. Note that in description of the drawings the same components are designated by the same reference signs, and the duplicated description is not repeated.

First Embodiment (Overview of Calculation Scheme Decision System)

A calculation scheme decision system 100 (see FIG. 4) according to an embodiment is a system which decides an optimal calculation scheme for a processing device having a hierarchical network. The hierarchical network is a network having a hierarchical structure, and examples of the hierarchical network include a neural network. The neural network is defined using a network structure, weight data, and the like. The neural network is described later in detail.

The processing device has an execution environment capable of executing various programs. In the execution environment, calculation for processing input data is performed using the network structure and weight data. The input data is data processed to achieve an aim of the hierarchical network. For example, the input data is recognition target data when the aim of the hierarchical network is recognition. The processing device is not specifically limited so long as it is a device having a hierarchical network. The processing device may be a terminal device labeling content of an image, a monitoring camera identifying an object position within an image (for example, a position of a person, or the like), or a general-purpose personal computer, as an example. In the following description, as an example of the processing device, a terminal device including a recognition unit 11 which recognizes content of recognition target data using a neural network is described (see FIG. 1 and FIG. 4, an example of a calculation unit). The recognition target data is data to be recognized by a computer, and examples of the recognition target data include image data, voice data, and text data.

A calculation scheme for the recognition unit 11 decided by the calculation scheme decision system 100 is a scheme for performing an arithmetic operation on an input and outputting a result. The calculation scheme decision system 100, on an assumption that the same result is output for an input with a predetermined accuracy performance, decides an optimal algorithm from among a plurality of kinds of executable algorithms, or an optimal algorithm from among a plurality of identical algorithms different in a usage amount or usage aspect of resources. Examples of the resource include a hardware resource and a software resource. Examples of the hardware resource include a CPU or a cache for performing the arithmetic operation. Examples of the software resource include a library. A resource used by an algorithm may be defined by parameters of the algorithm, for example.

The calculation scheme decision system 100 takes into account a calculation cost to decide the calculation scheme for the recognition unit 11. The calculation cost is evaluated by a time required for calculation as an example. In this case, the longer the time required for calculation, the more the calculation cost. The calculation cost may be evaluated by the usage amount of resources. In this case, the more the usage amount of resources, the more the calculation cost. The calculation cost may be evaluated by two of the time required for calculation and the usage amount of resources.

The calculation scheme decision system 100 decides a calculation scheme having the lowest calculation cost from among the calculation schemes executable in the execution environment for the recognition unit 11. The calculation scheme decision system 100 may select the calculation scheme having the calculation cost lower than an average of the calculation costs of the calculation schemes executable. In this way, the calculation scheme decision system 100 optimizes a calculation speed of the recognition unit 11, or optimizes the resource usage amount used by the recognition unit 11.

The calculation scheme decision system 100 exhaustively performs the calculation schemes executable in the execution environment for the recognition unit 11 in deciding the calculation scheme, and evaluates the calculation schemes based on results of the performing to decide an optimal calculation scheme.

As a specific example, the calculation scheme decision system 100 is configured to be able to execute performing calculation for each of respective layers of the network structure on predetermined data using at least one of calculation schemes prepared in advance for the respective layers of the network structure in the execution environment for the recognition unit 11, acquiring the calculation cost of at least one calculation schemes for the respective layers of the network structure based on a result of the calculation for each of the respective layers of the network structure, selecting one calculation scheme for each of the respective layers of the network structure, based on the calculation cost, from among at least one of the calculation schemes prepared in advance for the respective layers to associate the layer of the network structure with the selected one calculation scheme, and performing calculation for each of the respective layers of the network structure on the input data in the execution environment using the calculation scheme associated with each layer of the network structure.

(Details of Recognition Unit)

First, a description is given of the recognition unit 11 for which the calculation scheme decision system decides the calculation scheme. Hereinafter, a description is given, as an example, of a case that the recognition target data is the image data, and a target to be recognized is content of an image (person, animal, object, scenery, room, etc.).

FIG. 1 is a diagram illustrating the recognition unit 11. As shown in FIG. 1, the recognition unit 11 is included in a terminal device 10. The recognition unit 11 inputs recognition target data G1 that is image data, and outputs a recognition result. As shown in (A) of FIG. 1, the recognition target data G1 is the image data in which a dog is drawn. The recognition unit 11 inputs the image data (to be more specific, pixel value), and outputs a label representing content of the image by use of a training result (for example, network structure and weight data). The label, which is used to classify the content of the recognition target data, is information for identifying a category set in advance by a system user. In the example in (A) of FIG. 1, the recognition unit 11 outputs a label of "dog". The label is given to the recognition target data G1 by the recognition unit 11. The term giving means making an association, and, for example, only a relationship between the recognition target data G1 and the label may be recorded by means of an association table or the like, or the label may be incorporated into the recognition target data G1 itself. In general, the label being given to the recognition target data is referred to as annotation. The recognition unit 11, because of being capable of inputting the image data to give the label, can automatically classify the image data, or search a web for a desired image.

When there is a plurality of labels set in advance by the system user, there are a single-labeling process of giving the most possible label among the labels to the recognition target data, and a multi-labeling process of giving all labels having a certain possibility to the recognition target data. As shown in (B) of FIG. 1, recognition target data G2 is image data in which a person and flowers are drawn. In a case that the recognition unit 11 performs the single-labeling process, a label of "person" is given to the recognition target data G2 by the recognition unit 11. In a case that the recognition unit 11 performs the multi-labeling process, two labels, the label of "person" and a label of "flower" are given to the recognition target data G2 by the recognition unit 11.

Figure 2:
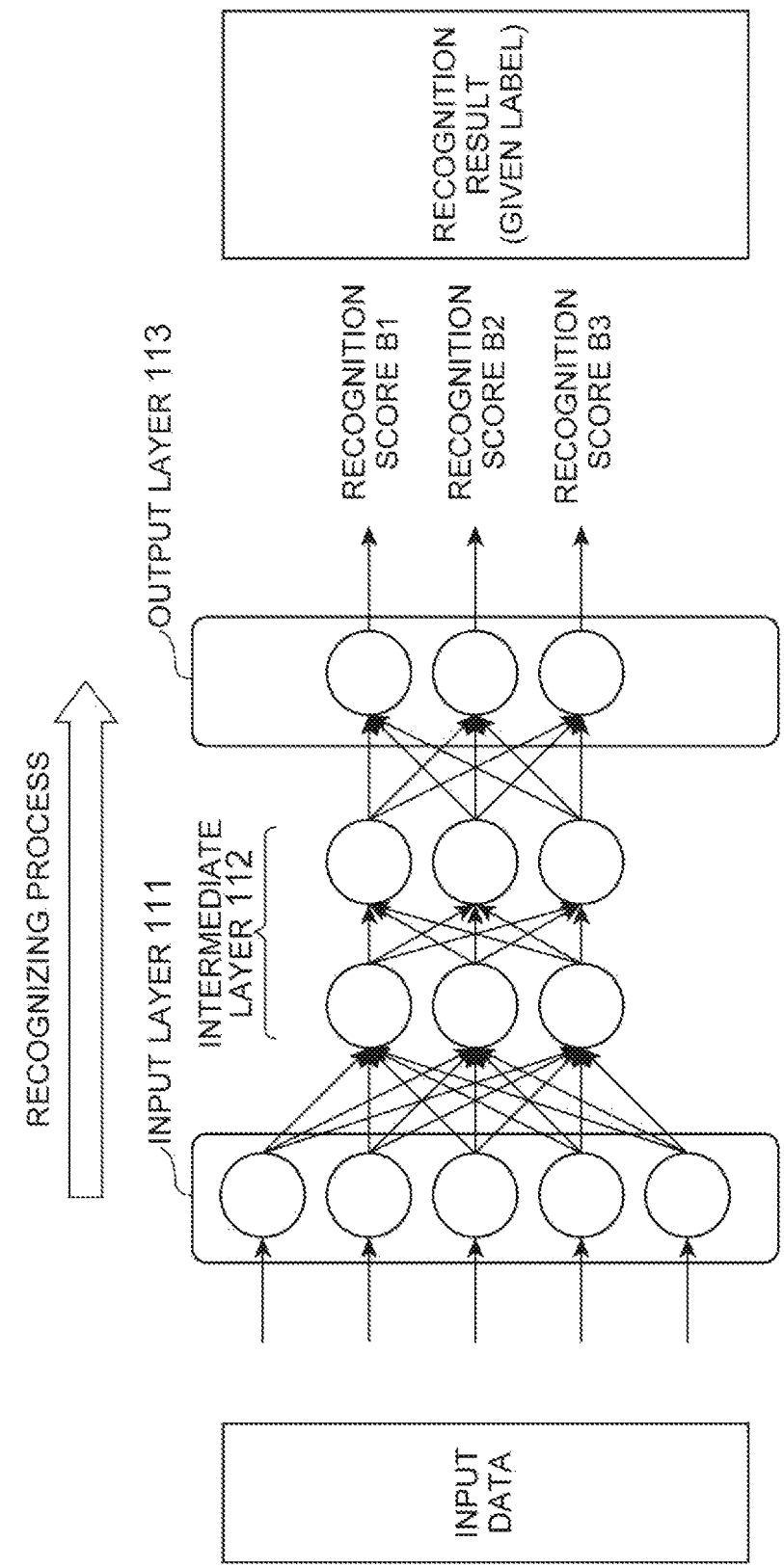
FIG. 2 is a diagram illustrating a neural network in the recognition unit.

FIG. 2 is a diagram illustrating a neural network in the recognition unit 11. The recognition unit 11 recognizes a label corresponding to the image data by use of the neural network. The neural network is an information processing system which models a cerebral nervous system. As shown in FIG. 2, the neural network in the recognition unit 11 is a so-called hierarchical neural network, in which many artificial neurons illustrated by circles form a hierarchy and are coupled to each other. The hierarchical neural network includes artificial neurons for input, artificial neurons for processing, and artificial neurons for output.

The artificial neurons for input acquire the recognition target data to distribute to the artificial neurons for processing. Hereinafter, a signal itself communicated in the neural network is referred to as a score. The score is a numerical value. The artificial neurons for input are arranged in parallel to form an input layer 111.

The artificial neurons for processing which are connected with the artificial neurons for input process inputs in accordance with functions of the artificial neurons to deliver outputs to other neurons. The artificial neurons for processing are arranged in parallel to form an intermediate layer 112. The intermediate layer 112 may be a plurality of layers. Note that three or more hierarchies of neural networks including the intermediate layer 112 are called a deep neural network.

The artificial neurons for output externally output the recognition score. The number of artificial neurons for output to be prepared is the same as the number of labels. In other words, the recognition score is output for each label in the neural network. In the example in FIG. 2, three artificial neurons are prepared correspondingly to three labels "dog", "person", and "flower". The artificial neurons for output outputs a recognition score B1 corresponding to the label of "dog", a recognition score B2 corresponding to the label of "person", and a recognition score B3 corresponding to the label of "flower". The recognition score is a score representing a recognition result, and in a case of training assuming that the positive evaluation is "1" and the negative evaluation "0", the higher the recognition score of the label, the higher a possibility that the label represents the content of the image. The artificial neurons for output are arranged in parallel to form an output layer 113.

The recognition unit 11 uses the recognition score output by the output layer 113 to decide a label to be given. For example, the recognition unit 11 gives the label corresponding to the recognition score equal to or more than a predetermined value to the recognition target data. This allows the recognition target data to be automatically given the label representing the recognition target data. Note that in the case of the single-labeling process, the recognition unit 11 gives the label corresponding to the highest recognition score to the recognition target data.

Figure 3:
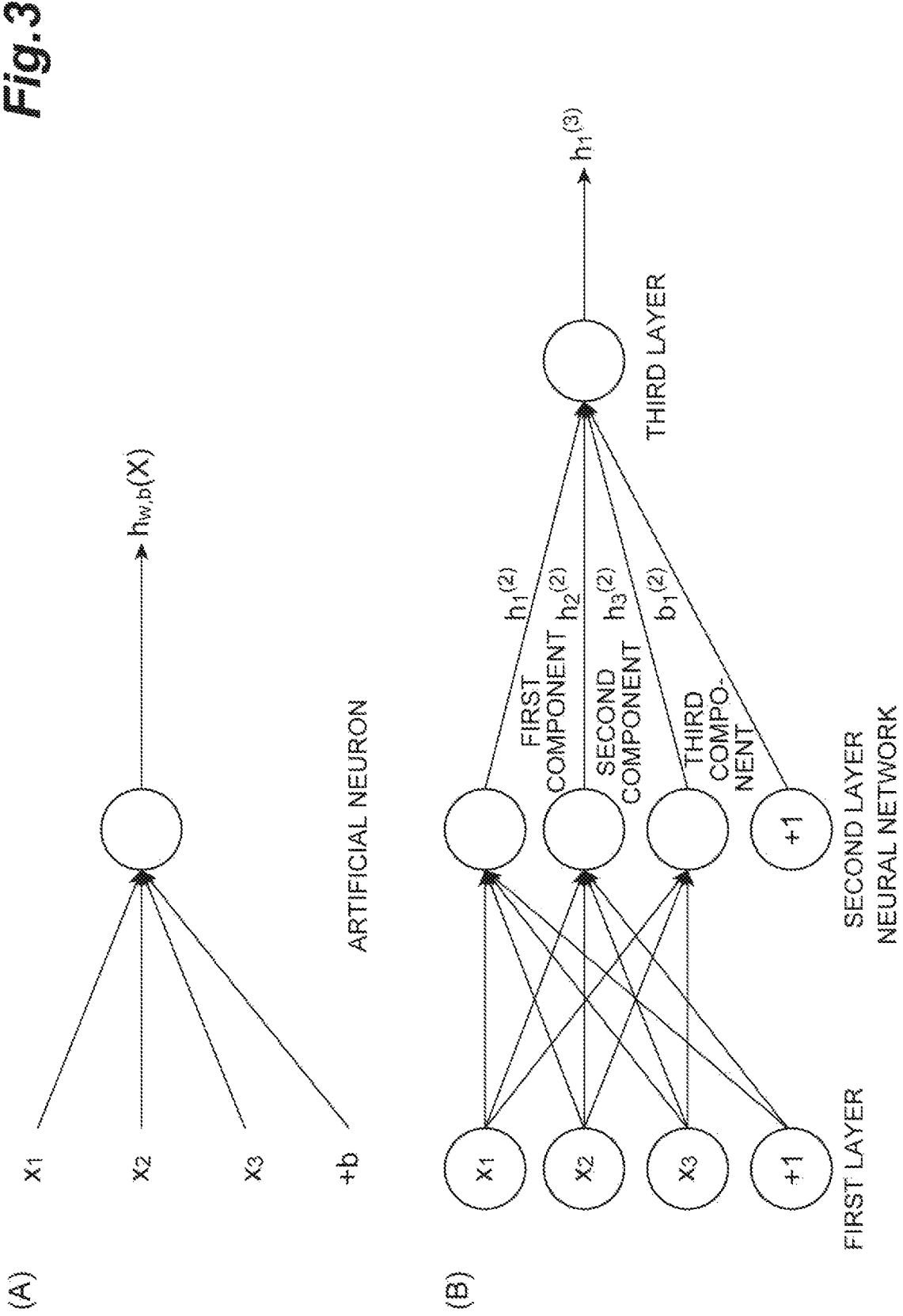
FIG. 3 is a diagram illustrating artificial neurons shown in FIG. 2.

FIG. 3 is a diagram illustrating the artificial neurons shown in FIG. 2. The artificial neurons shown in (A) of FIG. 3 input, $x_1$, $x_2$, and $x_3$, and multiply these by corresponding weight coefficients $w_1$, $w_2$, and $w_3$, respectively. The artificial neurons compute a sum of an integrated value $(x_1 \cdot w_1 \cdot x_2 \cdot w_2 \cdot x_3 \cdot w_3)$ and a bias value b. The sum is substituted into an activating function to obtain an output of the artificial neurons.

To be more specific, the output of the targeted artificial neurons is as the following mathematical expression.

$$h_{w,b}(x)' = g\left(\sum_{j=1}^{3} w_i \cdot x_j + b\right) = g(w_1 \cdot x_1 + w_2 \cdot x_2 + w_3 \cdot x_3 + b) \quad (1)$$

Here, g represents an activating function, for example, a sigmoid function.

(B) of FIG. 3 is a diagram illustrating the artificial neurons of N hierarchies (N=3). As shown in (B) of FIG. 3, in a case of three hierarchies, outputs $h_1^{(2)}$, $h_2^{(2)}$, and $h_3^{(2)}$ of the artificial neurons in the second hierarchy are as the following mathematical expressions 3 to 5, respectively. Here, n represents the number of artificial neurons in the targeted hierarchy, $w_{1j}^{(1)}$ represents a weight coefficient for the first artificial neuron in the second hierarchy corresponding to an output of the j-th output in the first hierarchy, and $b_1^{(1)}$ represents a bias value for the first hierarchy.

$$h_1^{(2)} = g\left(\sum_{j=1}^{n} w_{1j}^{(1)} \cdot x_j + b_1^{(1)}\right) \quad (3)$$

$$h_2^{(2)} = g\left(\sum_{j=1}^{n} w_{2j}^{(1)} \cdot x_j + b_2^{(1)}\right) \quad (4)$$

$$h_3^{(2)} = g\left(\sum_{j=1}^{n} w_{3j}^{(1)} \cdot x_j + b_3^{(1)}\right) \quad (5)$$

where, $w_{2j}^{(1)}$ represents a weight coefficient for the second artificial neuron in the second hierarchy corresponding to an output of the j-th output in the first hierarchy, $w_{3j}^{(1)}$ represents a weight coefficient for the third artificial neuron in the second hierarchy corresponding to an output of the j-th output in the first hierarchy, $b_2^{(1)}$ represents the second bias value in the first hierarchy, and $b_3^{(1)}$ represents the third bias value in the first hierarchy. Accordingly, an output $h_1^{(3)}$ of the artificial neuron in the third hierarchy is represented by the following mathematical expression 6.

$$h_1^{(3)} = g\left(\sum_{j=1}^{n} w_{1j}^{(2)} \cdot h_j^{(2)} + b_1^{(2)}\right) \quad (6)$$

Note that the bias value b is not necessarily needed, and only the integrated value of the output of the artificial neuron and weight coefficient in the previous hierarchy may be used to calculate the output.

The artificial neurons are not limited to the above, and may be those generalized. A general expression for a function of the i-th intermediate layer 112 is as the following mathematical expression 7.

$$v^{(i)} = f^{(i)}(x^{(i)}|w^{(i)}, b^{(i)}) \quad (7)$$

Here, $x^{(i)}$ represents an input vector to the intermediate layer 112, $w^{(i)}$ represents a weight parameter vector for the intermediate layer 112, and $b^{(i)}$ represent a bias vector, and $v^{(i)}$ represents an output vector of the intermediate layer 112. Examples of the intermediate layer 112 generally used in image recognition include a fully connected layer and a convolutional layer. The output of the fully connected layer illustrated in FIG. 3 is generally as the following mathematical expression 8.

$$v_q^{(i)} = \sum_p \{w_{p,q}^{(i)} \cdot x_p^{(i)}\} + b_q^{(i)} \quad (8)$$

Here, $x_p^{(i)}$ represents the p-th component of the input of the i-th intermediate layer 112, $v_q^{(i)}$ represents the q-th component of the output of the intermediate layer 112, and $w_{p,q}^{(i)}$ represents p, q components of the weight coefficient for the intermediate layer 112. The output of the convolutional layer is as the following mathematical expression 9.

$$v_{q,(r,s)}^{(i)} = \sum_p \sum_{r'} \sum_{s'} \{w_{p,q,(r',s')}^{(i)} \cdot x_{p,(r+r',s+s')}^{(i)}\} + b_q^{(i)} \quad (9)$$

Here, $x_{p,(r,s)}^{(i)}$ represents a (r, s) component on the p-th channel of the input of the i-th intermediate layer 112, $v_{q,(r,s)}^{(i)}$ represents a (r, s) component on the q-th channel of the output of the intermediate layer 112, and $w_{p,q,(r',s')}^{(i)}$ represents a weight coefficient for a convolutional filter of the intermediate layer 112. r' and s' vary from 0 to values (width−1), and (height−1) of the convolutional filter. By repeating the calculation of the intermediate layer 112 and activating function gi) as above, the output of the intermediate layer immediately before the output layer 113 is as the following mathematical expression 10.

$$h^{(N)} = g^{(N)}(f^{(N)}(g^{(N-1)}(f^{(N-1)}(\ldots |w^{(N-1)}, b^{(N-1)}))|w^{(N)}, b^{(N)})) \quad (10)$$

The network structure, weight coefficient (weight data), and bias value described above are those trained by a training device 30 described later, and delivered as the training results to the recognition unit 11. In other words, the training device 30 is a device training the network structure, weight coefficient, and bias value which make a feature amount of the recognition target data correspond to the label indicating the content thereof. Note that when the recognition unit 11 does not use the bias value b, the training device 30 trains only the network structure and weight coefficient.

(Configuration of Calculation Scheme Decision System)

Figure 4:
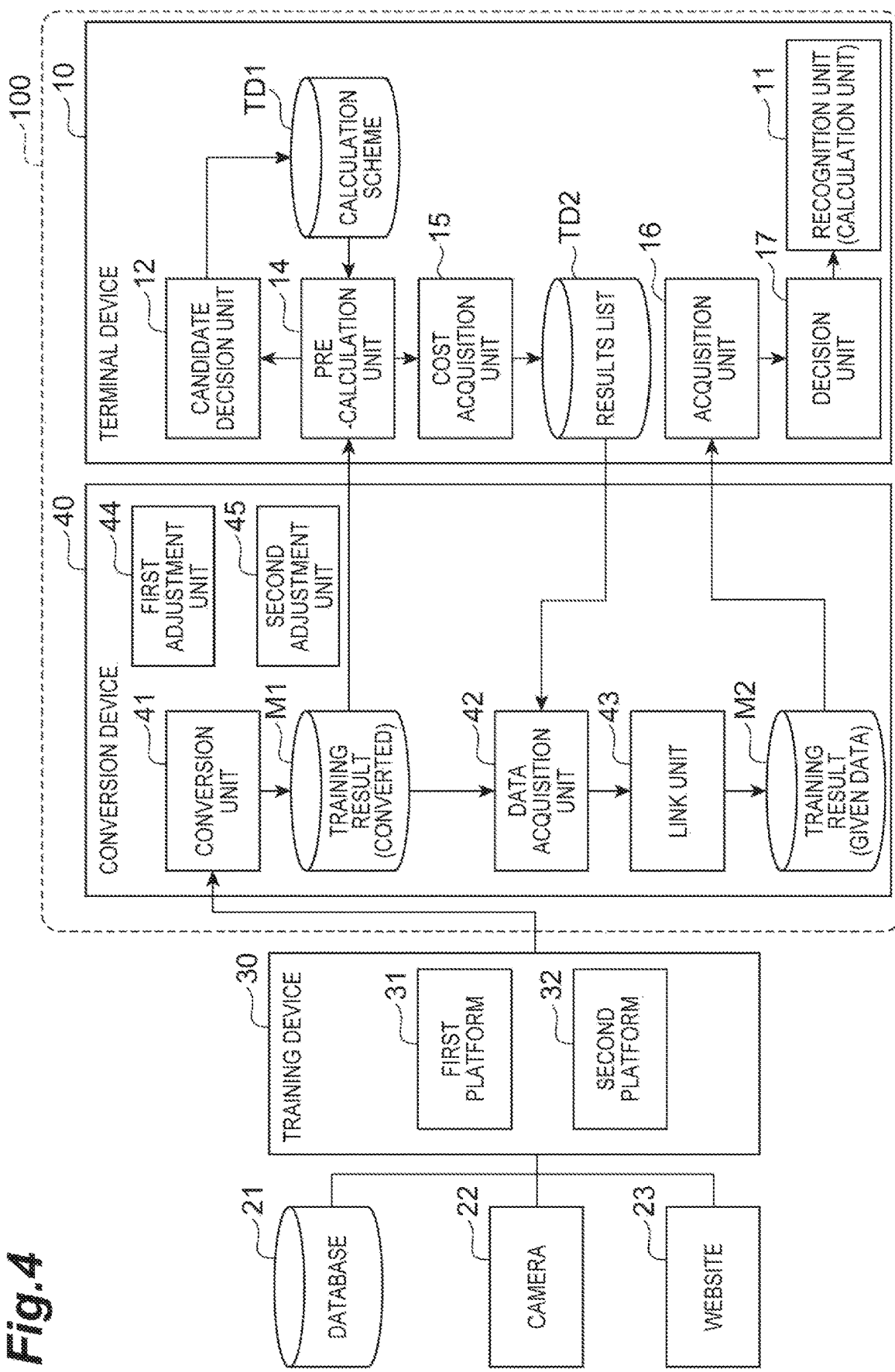
FIG. 4 is a functional block diagram of a calculation scheme decision system according to a first embodiment.

FIG. 4 is a functional block diagram of the calculation scheme decision system 100 according to the embodiment. As shown in FIG. 4, the calculation scheme decision system 100 includes the terminal device 10 and a conversion device 40, and is connected to the training device 30. The training device 30 collects and is trained with the image data. The training result of the training device 30 is provided via the conversion device 40 to the terminal device 10.

(Hardware Configuration)

Figure 5:
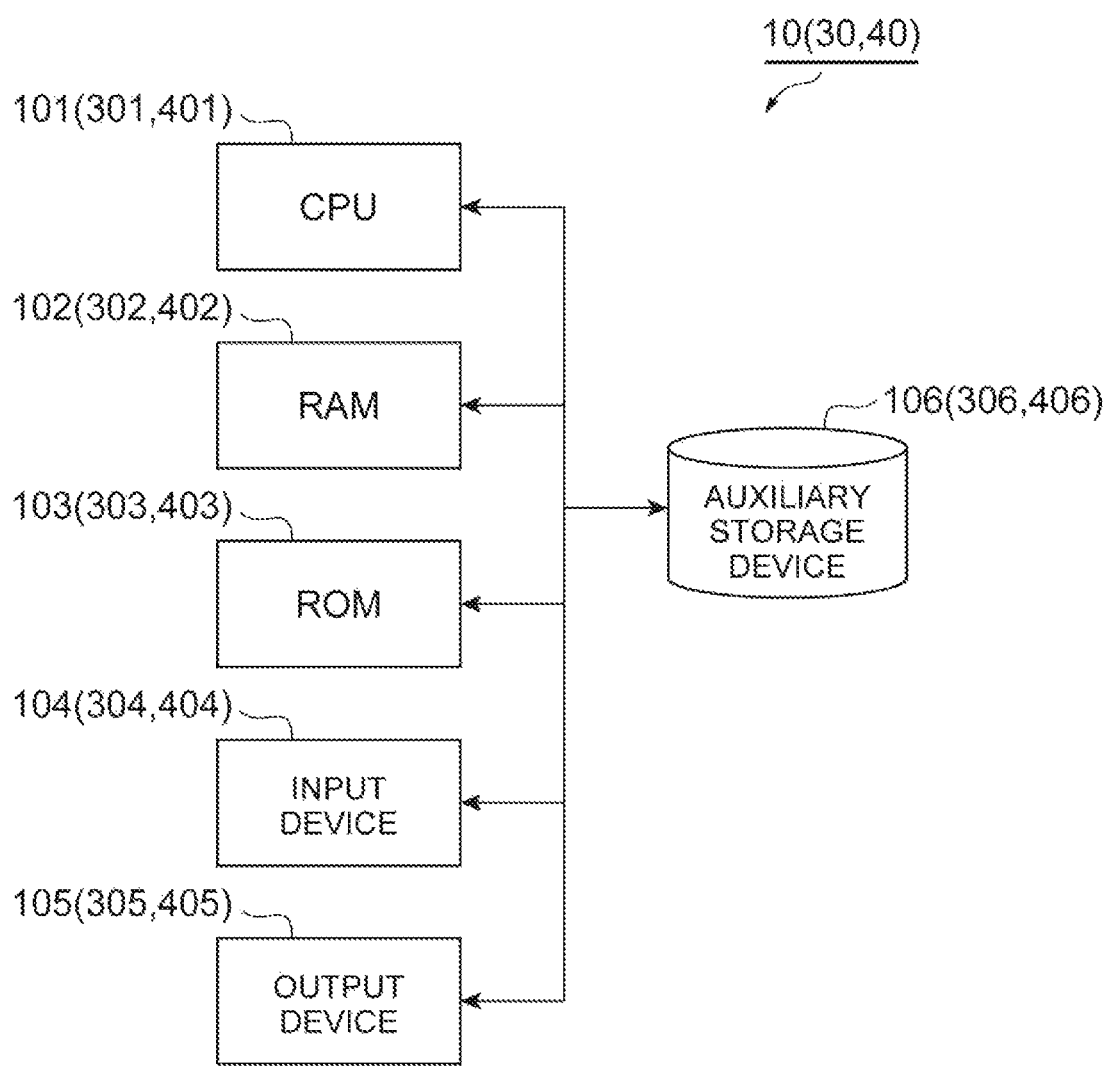
FIG. 5 is s block diagram showing a hardware configuration of a device shown in FIG. 4.

First, a description is given of hardware of the terminal device 10, the training device 30, and the conversion device 40. FIG. 5 is s block diagram showing a hardware configuration of the device shown in FIG. 4. As shown in FIG. 5, the terminal device 10 is configured physically as an ordinary computer system including a CPU (Central Processing Unit) 101, a main memory such as a RAM (Random Access Memory) 102 and a ROM (Read Only Memory) 103, an input device 104 such as a touch panel and a keyboard, an output device 105 such as a display, an auxiliary storage device 106 such as a hard disk, and the like. Functions of the terminal device 10 are implemented by that the CPU 101 reads predetermined computer software into the hardware such as RAM 102 and ROM 103 to cause the input device 104 and output device 105 to operate under control of the CPU 101, and to read and write data from and into the main memory or the auxiliary storage device 106. Note that the terminal device 10 may include hardware other than those described above. For example, the terminal device 10 may include a GPU (Graphics Processing Unit), a FPGA (Field-Programmable Gate Array), a DSP (Digital Signal Processor), or the like.

The hardware of the training device 30 and conversion device 40 can be also configured by the hardware the same as the terminal device 10. Specifically, the training device 30 is configured physically as an ordinary computer system including a CPU 301, a main memory such as a RAM 302 and a ROM 303, an input device 304, an output device 305, an auxiliary storage device 306, and the like. The conversion device 40 is configured physically as an ordinary computer system including a CPU 401, a main memory such as a RAM 402 and a ROM 403, an input device 404, an output device 405, an auxiliary storage device 406, and the like. Functions of the conversion device 40 are implemented by that the CPU 401 reads predetermined computer software into the hardware such as RAM 402 and ROM 403 to cause the input device 404 and output device 405 to operate under control of the CPU 401, and to read and write data from and into the main memory or the auxiliary storage device 406. Note that the training device 30 and the conversion device 40 are not necessarily accommodated as the hardware in one housing, and may be separated into some devices.

(Functional Configuration)

First, a description is given of a functional configuration of the training device 30. The training device 30 collects and is trained with the image data. The training device 30, which is connected with a database 21 storing the image data, a camera 22 generating the image data, a website 23 from which the image data can be downloaded, and the like, can acquire the image data that is the input data for training. Of course, the training device 30 may be connected to an external storage medium to acquire the image data, or receive the image data via communication, and is not limited to the aspect of image data acquisition.

The training device 30 includes a platform for establishing a neural network through machine learning. The platform is an operating environment for machine learning of a training model base on training data. The training model is a network structure, weight data, and the like, for example, and training data is image data, for example. The platform includes framework that is a software group performing the machine learning. For the platform and the framework, there are a plurality of formats for a training result depending on a difference in a language used, a difference in a design concept, or the like.

As an example, the training device 30 includes a first platform 31 and a second platform 32. The first platform 31 and the second platform 32 are platforms different from each other. Specifically, the training device 30 outputs the trained models different from each other in the format as the training results. The training result includes the network structure and the weight data.

The conversion device 40 converts the training results different in the format acquired from the training device 30 into those having a uniform format, and provides the converted results to the terminal device 10. This allows the terminal device 10 to use the training result trained by any platform.

The conversion device 40 includes a conversion unit 41. The conversion unit 41 acquires the network structure and the weight data from the training device 30 (an example of an external device) and converts the acquired network structure and weight data into a training result M1 having a uniform format (an example of a predetermined format).

The conversion device 40 not only converts the format of the training result but also performs a predetermined process on the training result M1 such that an operation of the recognition unit 11 in the terminal device 10 is efficient. Specifically, the conversion device 40 is configured to be able to execute acquiring, from the terminal device 10 (an example of the processing device) in which calculation for processing the input data is performed using the network structure and the weight data, a calculation cost in a case of calculating, for each of respective layers of the network structure, in at least one of calculation schemes prepared in advance for the respective layers of the network structure.

For such a process, the conversion device 40 includes a data acquisition unit 42. The data acquisition unit 42 in the conversion device 40 acquires, for respective layers of the network structure, the calculation cost in the case of calculating in the calculation scheme prepared in advance for each of the respective layers of the network structure, from the terminal device 10. Acquiring the calculation cost for each of the respective layers of the network structure means acquiring the calculation cost for each of the respective layers of the neural network described above, and as an example, the data acquisition unit 42 acquires the calculation cost for each intermediate layer 112. As a specific example, the data acquisition unit 42 acquires a calculation cost, from a result of actually performing the process in calculation schemes prepared for the respective layers, such as a calculation cost for each of a plurality of algorithms prepared for a first convolutional layer, a calculation cost for each of a plurality of algorithms prepared for a first fully connected layer, and a calculation cost of one algorithm prepared for a second convolutional layer. As a more specific example, the data acquisition unit 42 acquires a results list TD2 in which a layer, a calculation scheme, and the calculation cost are associated with each other from the terminal device 10. Hereinafter, the results list TD2 is also referred to as a profile.

The conversion device 40 includes a link unit 43 which links the results list TD2 acquired by the data acquisition unit 42 with the training result M1. As an example, the link unit 43 stores information of the selected algorithm in an attribute data area of data of the training result. By doing so, the link unit 43 generates a training result M2 associated with the results list TD2. The training result M2 is data output to the terminal device 10.

The terminal device 10 includes not only the recognition unit 11 but also a candidate decision unit 12, a pre-calculation unit 14, and a cost acquisition unit 15 so that the data acquisition unit 42 described above can acquire the results list TD2.

The pre-calculation unit 14 acquires the training result M1 from the conversion device 40. Then, the pre-calculation unit 14 outputs information of layer included in the training result M1 to the candidate decision unit 12.

The candidate decision unit 12 prepares at least one calculation scheme for each of the respective layers of the network structure based on the execution environment. As an example, the candidate decision unit 12 decides a calculation scheme TD1 executable for each layer based on the information of layer included in the training result M1, referring to a hardware configuration profile, a software library and the like in the execution environment for the terminal device 10. This allows the calculation scheme to be prepared for each layer before the performance of the pre-calculation unit 14.

The calculation scheme TD1 includes a plurality of algorithms which are executable in the execution environment and exert the same function using arithmetic operations different from each other, for example. Examples of the calculation scheme TD1 include an algorithm in which an order of a loop hierarchy is different, an algorithm using a CPU extension function, and an algorithm not using the CPU extension function. In the case of the algorithms exerting the same function using arithmetic operations different from each other, the calculation scheme TD1 may use the same resource or different resources. The calculation scheme TD1 may include a plurality of algorithms which are executable in the execution environment and performs the same arithmetic operation using resources different from each other, for example. Examples of the calculation scheme TD1 include the same algorithms different in parameters (such as a thread to be used, a cache size to be used), an algorithm performing an arithmetic operation using a CPU and an algorithm performing an arithmetic operation using a GPU, and an algorithm using a hardware acceleration and an algorithm not using a hardware acceleration.

The pre-calculation unit 14 performs the calculation for each of the respective layers of the network structure on predetermined data using the calculation scheme TD1 prepared in advance for each of the respective layers of the network structure, in the terminal device 10. The predetermined data may be any data so long as it is data which is processable in the neural network and predefined, and may be test data prepared in advance. The pre-calculation unit 14 exhaustively performs the calculation scheme TD1. For example, in a case where three calculation schemes are prepared for a convolutional layer, the pre-calculation unit 14 performs the calculation of the convolutional layer in each of the calculation schemes one or more times.

The cost acquisition unit 15 acquires the calculation cost of at least one calculation scheme for each of the respective layers of the network structure based on a result of the calculation by the pre-calculation unit 14. The cost acquisition unit 15 generates the results list TD2 in which a layer, a calculation scheme, a calculation cost are associated with each other. As an example, the cost acquisition unit 15 generates the results list TD2 in which a layer, a calculation scheme, and an arithmetic operation speed. The results list TD2 is output to the conversion device 40 and acquired by the data acquisition unit 42 as described above.

The terminal device 10 further includes an acquisition unit 16 and a decision unit 17. The acquisition unit 16 acquires the training result M2 associated with the results list TD2 from the conversion device 40.

The decision unit 17 selects one calculation scheme for each of the respective layers of the network structure based on the calculation cost from among the calculation schemes prepared in advance for the respective layers based on the training result M2 to associate the layer of network structure with the selected one calculation scheme. The decision unit 17 selects the calculation scheme of which the calculation cost is the lowest, for example. As a specific example, the decision unit 17 selects an algorithm of which a calculation cost is the lowest from among a plurality of algorithms prepared for the first convolutional layer. Then, the decision unit 17 associates the first convolutional layer with the selected algorithm. The term "associate" means that a specific algorithm is made to be able to be called for calculating a specific layer.

The recognition unit 11 refers to the training result M2, and performs calculation for each of the respective layers of the network structure on the input data in the execution environment using the calculation scheme associated with each layer of the network structure by the decision unit 17. This improves recognition process efficiency.

(Data Adjustment)

The conversion device 40 may change a data array (data order) of the training result. The training result is data in which the weight data is very large volume. For this reason, a data army of the weight data may be changed to be easy to refer to by the terminal device 10. The conversion device 40 may include a first adjustment unit 44 for such a process.

The first adjustment unit 44 may change a data array of the weight data for the training result M1, or may change a data array of the weight data for the training result M2. Hereinafter, a description is given as an example of a case where the first adjustment unit 44 changes the data array of the weight data for the training result M1.

The first adjustment unit 44 changes the data array of the weight data for the training result M1 based on the execution environment for the terminal device 10. For example, the first adjustment unit 44 changes the data array of the weight data such that the data becomes a state of being easy to be placed on a cache depending on a cache size of the terminal device 10 or the like. This allows the pre-calculation unit 14 and the recognition unit 11 to perform calculation based on the weight data adjusted by the first adjustment unit.

Alternatively, the conversion device 40 may perform a preprocess related to the calculation of the recognition unit 11 on the weight data. The conversion device 40 may include a second adjustment unit 45 for such a process. The recognition unit 11, in a case of a process on the convolutional layer, for example, performs frequency conversion on the weight data, and then, performs the arithmetic operation. For this reason, the second adjustment unit 45 perform a preprocess of the frequency conversion on the weight data used for the convolutional layer. This eliminates the need for the frequency conversion on the terminal device 10 side, and therefore, the recognition process efficiency improves. Alternatively, in a case where compiling OpenCL (Open Computing Language) (registered trademark) or the like is needed in the calculation of the recognition unit 11, the second adjustment unit 45 may perform a preprocess of offline compiling.

The link unit 43 may encrypt the training result M2 for security improvement.

(Operation of Calculation Scheme Decision System: Calculation Scheme Decision Method)

Hereinafter, a description is given of operations of the conversion device 40 and the terminal device 10.

(Converting Process)

Figure 6:
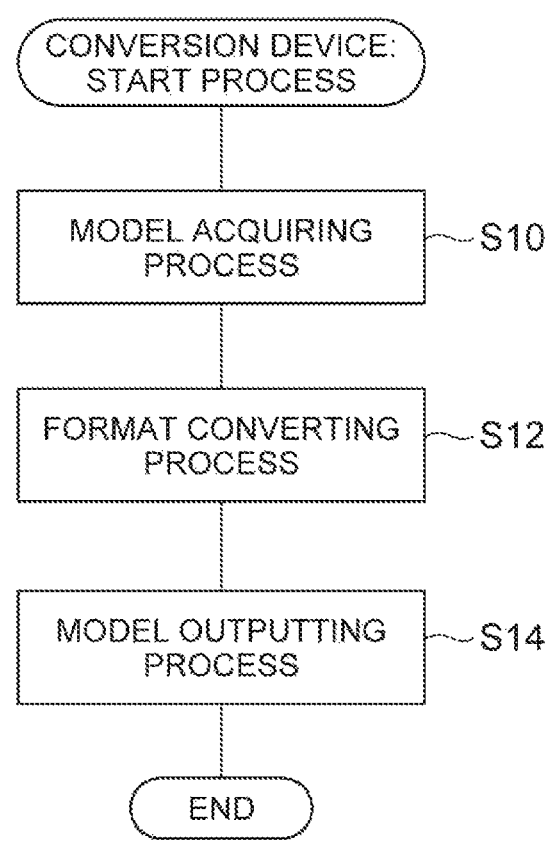
FIG. 6 is a flowchart of a converting process.

FIG. 6 is a flowchart of a converting process. The flowchart shown in FIG. 6 is performed by the conversion unit 41 in the conversion device 40.

As shown in FIG. 6, the conversion unit 41 in the conversion device 40 acquires a training model (network structure and weight data) from the training device 30, as a model acquiring process (S10). Subsequently, the conversion unit 41 converts the training model acquired in the model acquiring process (S10) into a uniform format, as a format converting process (S12). Subsequently, the conversion unit 41 outputs the training result M1 in the uniform format, as a model outputting process (S14). When the model outputting process (S14) is completed, the flowchart in FIG. 6 ends.

The flowchart shown in FIG. 6 is performed so that the training model is acquired and converted into the uniform format.

(Profile Acquiring Process)

Figure 7:
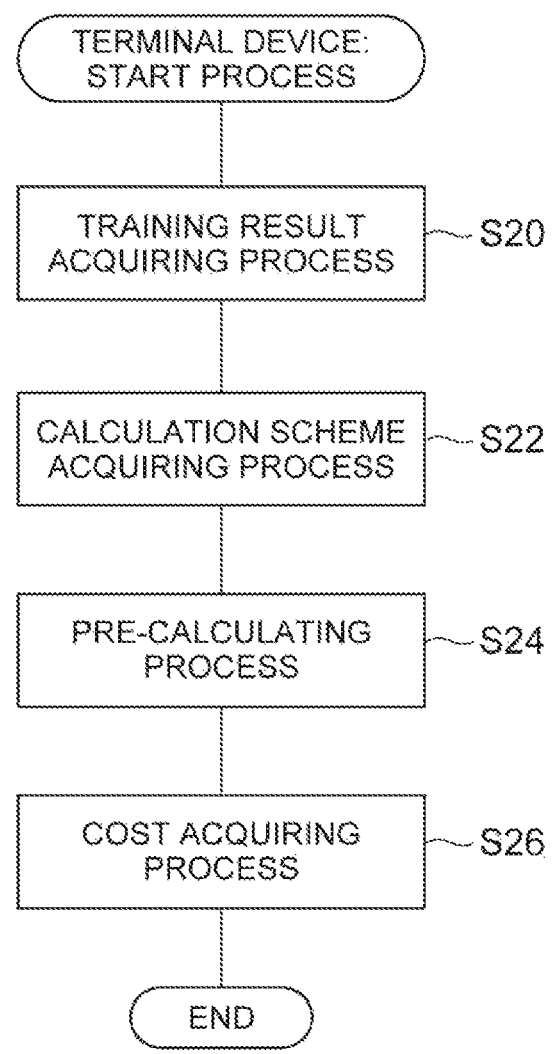
FIG. 7 is a flowchart of a profile acquiring process.

FIG. 7 is a flowchart of a profile acquiring process. The flowchart shown in FIG. 7 is performed by the terminal device 10.

As shown in FIG. 7, the pre-calculation unit 14 in the terminal device 10 acquires the training result M1, as a training result acquiring process (S20). Subsequently, the pre-calculation unit 14 acquires the calculation scheme TD1 prepared in advance, as a calculation scheme acquiring process (S22). The pre-calculation unit 14 refers to the calculation scheme TD1 stored by the candidate decision unit 12. Subsequently, the pre-calculation unit 14 inputs the test data to the training result M1 and exhaustively performs the prepared calculation schemes, as a pre-calculating process (S24), At this time, a processing speed or usage resource for each calculation scheme is measured as an arithmetic operation cost. The cost acquisition unit 15 in the terminal device 10 generates the results list TD2 in which a layer, a calculation scheme, and an arithmetic operation are associated with each other based on a time and the usage resource required for calculation by the pre-calculation unit 14, as a cost acquiring process (S26). When the cost acquiring process (S26) is completed, the flowchart in FIG. 7 ends. Note that an execution order of the training result acquiring process (S20) and the calculation scheme acquiring process (S22) may be reversed. The pre-calculating process S24 and the cost acquiring process may be alternately performed every layer.

The flowchart shown in FIG. 7 is performed so that an operation result of the operating environment can be acquired.

(Information Giving Process)

Figure 8:
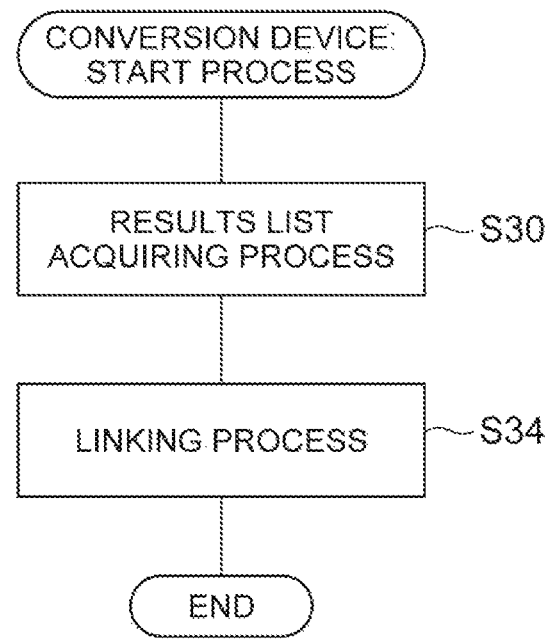
FIG. 8 is a flowchart of an information giving process.

FIG. 8 is a flowchart of an information giving process. The flowchart shown in FIG. 8 is performed by the conversion device 40.

As shown in FIG. 8, the data acquisition unit 42 in the conversion device 40 acquires the results list TD2 from the terminal device 10, as a results list acquiring process (S30). Subsequently, the link unit 43 links the training result M1 with the results list TD2 (profile) to generate the training result M2, as a linking process (S34). When the linking process (S34) is completed, the flowchart shown in FIG. 8 ends.

The flowchart shown in FIG. 8 is performed so that the training result M2 to which a result of the calculation cost is given is generated.

(Calculating Process)

Figure 9:
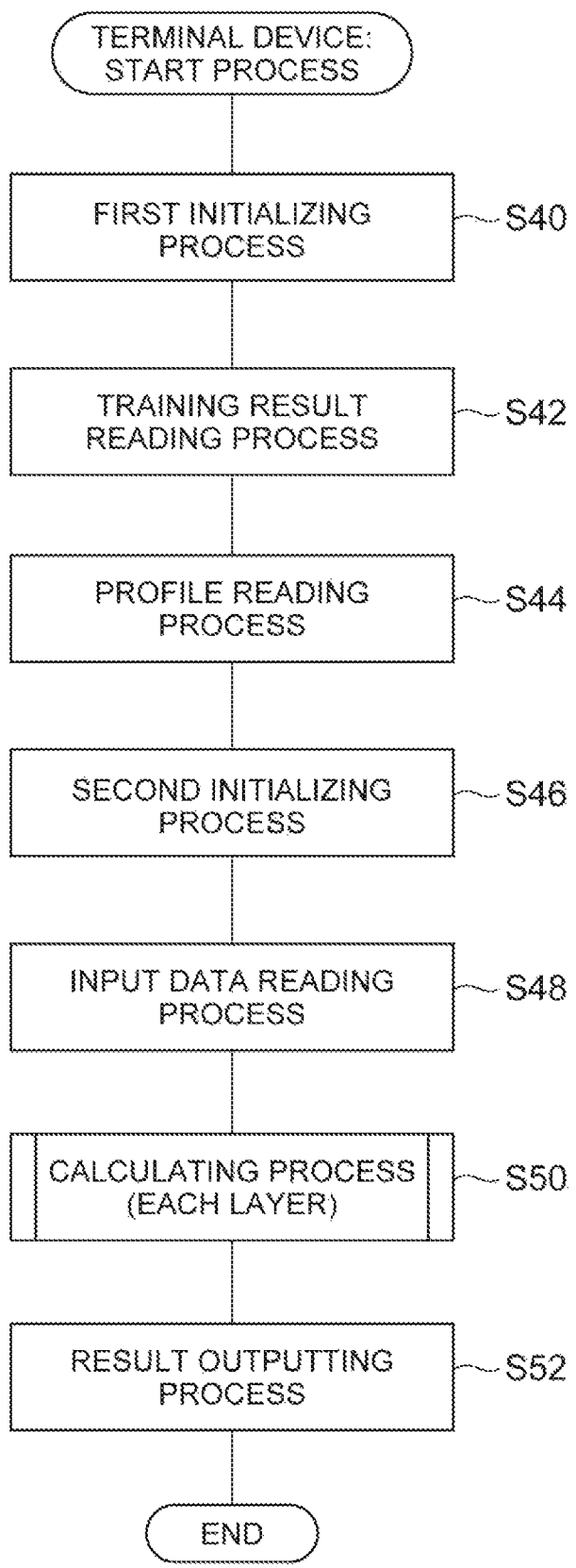
FIG. 9 is a flowchart of a calculating process.

FIG. 9 is a flowchart of a calculating process. The flowchart shown in FIG. 9 is performed by the terminal device 10.

Figure 10:
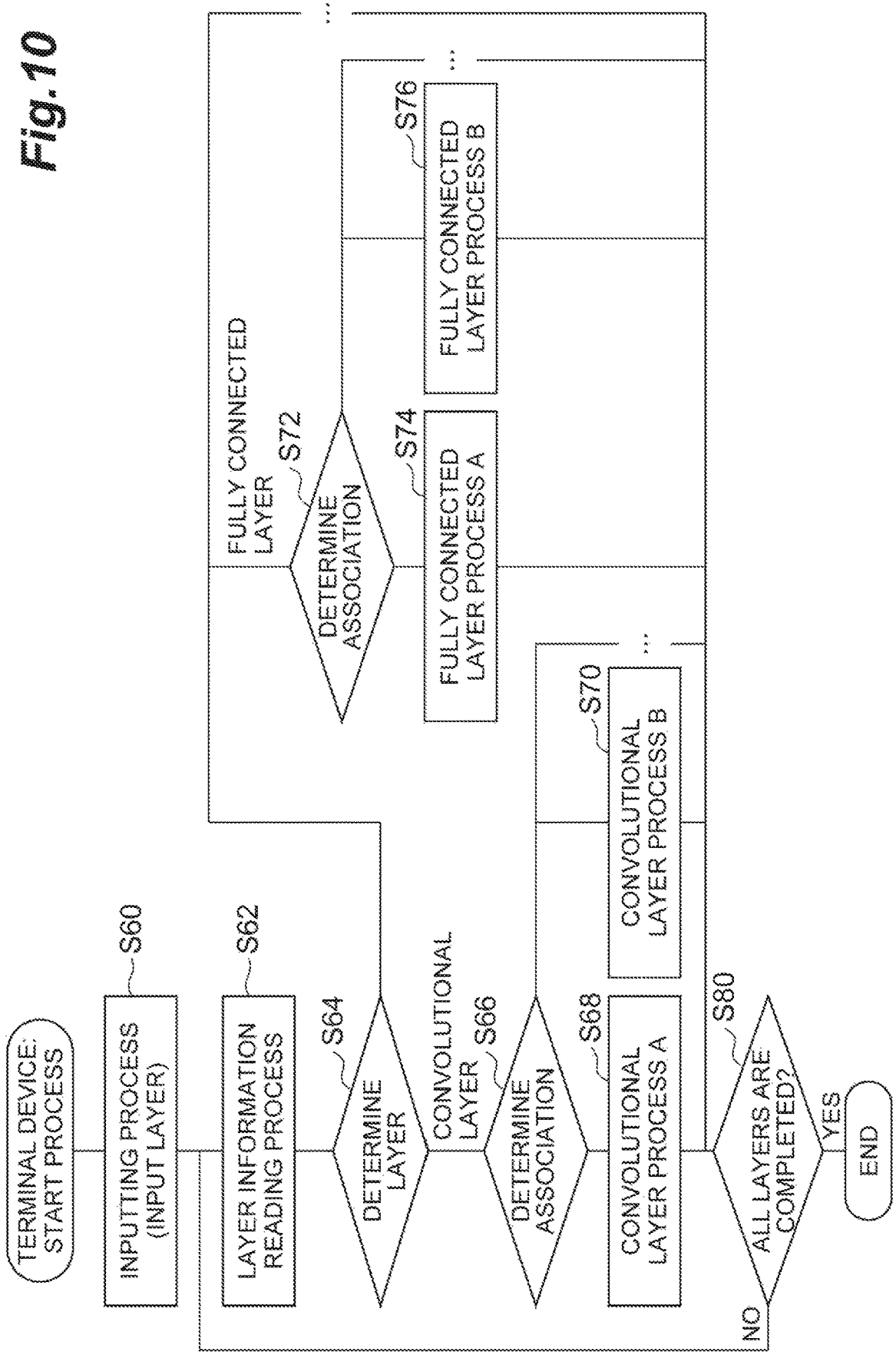
FIG. 10 is a flowchart of a calculating process.

As shown in FIG. 9, the terminal device 10 secures a memory required for the process, as a first initializing process (S40). Subsequently, the recognition unit 11 in the terminal device 10 reads the training result M2 acquired from the conversion device 40, as a training result reading process (S42). Similarly, the recognition unit 11 in the terminal device 10 reads the results list TD2 given to the training result M2 acquired from the conversion device 40, as a profile reading process (S44). Subsequently, the terminal device 10 secures a memory required for the process, as a second initializing process (S46). Subsequently, the recognition unit 11 inputs data to be identified, as an input data reading process (S48). Subsequently, the recognition unit 11 performs a calculating process for recognition in each layer, as a calculating process (S50). At this time, the results list TD2 read in the profile reading process (S44) is used. The calculating process (S50) is described later in detail (FIG. 10). Finally, the recognition unit 11 outputs a result of recognition, as a result outputting process (S52), When the result outputting process (S52) is completed, the flowchart shown in FIG. 9 ends.

FIG. 10 is a flowchart of a calculating process and illustrates the calculating process (S50) in FIG. 9 in detail. As shown in FIG. 10, the recognition unit 11 inputs all pixel values corresponding to one image to the input layer, as an inputting process (S60). Subsequently, the recognition unit 11 inputs information of a layer to be processed, as a layer information reading process (S62). In the information of layer, included is information identifying which layer of the neural network is the layer to be processed. Subsequently, the recognition unit 11 branches the process based on the identification information acquired in the layer information reading process (S62), as a layer determining process (S64).

In a case where the layer to be processed is a convolutional layer, the decision unit 17 refers to the results list TD2 and specifies a calculation scheme of which a calculation cost is the smallest in a convolutional layer process, as an association determining process (S66). In a case where the calculation cost is the smallest in a convolutional layer process A, the decision unit 17 associates the convolutional layer process A with the layer to be processed. Then, the recognition unit 11 performs the convolutional layer process A, as a performing process (S68). On the other hand, in a case where the calculation cost is the smallest in a convolutional layer process B, the decision unit 17 associates the convolutional layer process B with the layer to be processed. The convolutional layer process B is a process in which the function is the same as the above but implementation is different. Then, the recognition unit 11 performs the convolutional layer process B, as a performing process (S70). In the above example, two cases that the calculation scheme is the convolutional layer process A and that the calculation scheme is the convolutional layer process B are described, but the number of the processes may be three or more. In this way, the decision unit 17 branches the process depending on the results list TD2.

On the other hand, in a case where the layer to be processed is a fully connected layer, the decision unit 17 refers to the results list TD2 and specifies a calculation scheme of which a calculation cost is the smallest in a fully connected layer process, as an association determining process (S72). In a case where the calculation cost is the smallest in a fully connected layer process A, the decision unit 17 associates the fully connected layer process A with the layer to be processed. Then, the recognition unit 11 performs the fully connected layer process A, as a performing process (S74). On the other hand, in a case where the calculation cost is the smallest in a fully connected layer process B, the decision unit 17 associates the fully connected layer process B with the layer to be processed. The fully connected layer process B is a process in which the function is the same as the above but implementation is different. Then, the recognition unit 11 performs the fully connected layer process B, as a performing process (S76). In the above example, two cases that the calculation scheme is the fully connected layer process A and that the calculation scheme is the fully connected layer process B are described, but the number of the processes may be three or more. In this way, the decision unit 17 branches the process depending on the results list TD2.

In a case where the layer to be processed is a further another layer, for example, a pooling layer, an activation function layer, or the like, the same processes as for the convolutional layer and the fully connected layer are performed.

When the process corresponding to each layer is completed, the recognition unit 11 determines whether or not the process is completed for all layers of the neural network, as a determining process (S80). In a case where the process is determined to be not completed for all layers, the process goes to the layer information reading process (S62) to continue the process on the next layer. In a case that the process is determined to be completed for all layers, the flowchart shown in FIG. 10 ends.

Next, a description is given of a calculation scheme decision program causing to function as the calculation scheme decision system 100. The calculation scheme decision program includes a main module, a pre-calculation module, a cost acquisition module, a decision module, and a calculation module. The main module is a part for collectively controlling the device. The functions realized by performing the pre-calculation module, the cost acquisition module, the decision module, and the calculation module are respectively similar to the functions of the above described pre-calculation unit 14, cost acquisition unit 15, decision unit 17, and recognition unit 11.

The program is provided by way of a non-transitory record such as the ROM or a semiconductor memory medium, for example. The program may be provided through a communication of a network or the like.

Conclusion of First Embodiment

In the calculation scheme decision system 100, one calculation scheme is selected for each layer, from among the calculation schemes prepared in advance, based on the calculation cost obtained by actually operating those calculation schemes in the execution environment. In this way, the calculation scheme decision system 100 can take into account the calculation cost to decide an optimal calculation scheme for each layer. Therefore, the calculation scheme decision system 100 can take into account the calculation cost to decide the calculation scheme.

The calculation scheme decision system 100 can actually operate, in the execution environment, a plurality of algorithms which output the same results but are different from each other in the arithmetic operation method, and decide an optimal algorithm based on the obtained calculation costs.

The calculation scheme decision system 100, because of including the candidate decision unit 12, can prepare the calculation scheme taking into account the resources in the execution environment.

The calculation scheme decision system 100, because of including the conversion unit 41, can deal with the training result of the training device 30 in a predetermined format.

The calculation scheme decision system 100, because of including the first adjustment unit 44, can change the data array of the weight data such that the data becomes a state of being easy to be placed on a cache.

The calculation scheme decision system 100, because of including the second adjustment unit 45, can reduce a calculation load on the recognition unit 11.

Second Embodiment

A calculation scheme decision system 100A according to a second embodiment is different in that the function of the decision unit 17 is on the conversion device 40 side, and the same in other aspects, as compared with the calculation scheme decision system 100 according to the first embodiment. In the second embodiment, the description the same as in the first embodiment is not repeated.

(Configuration of Calculation Scheme Decision System)

Figure 11:
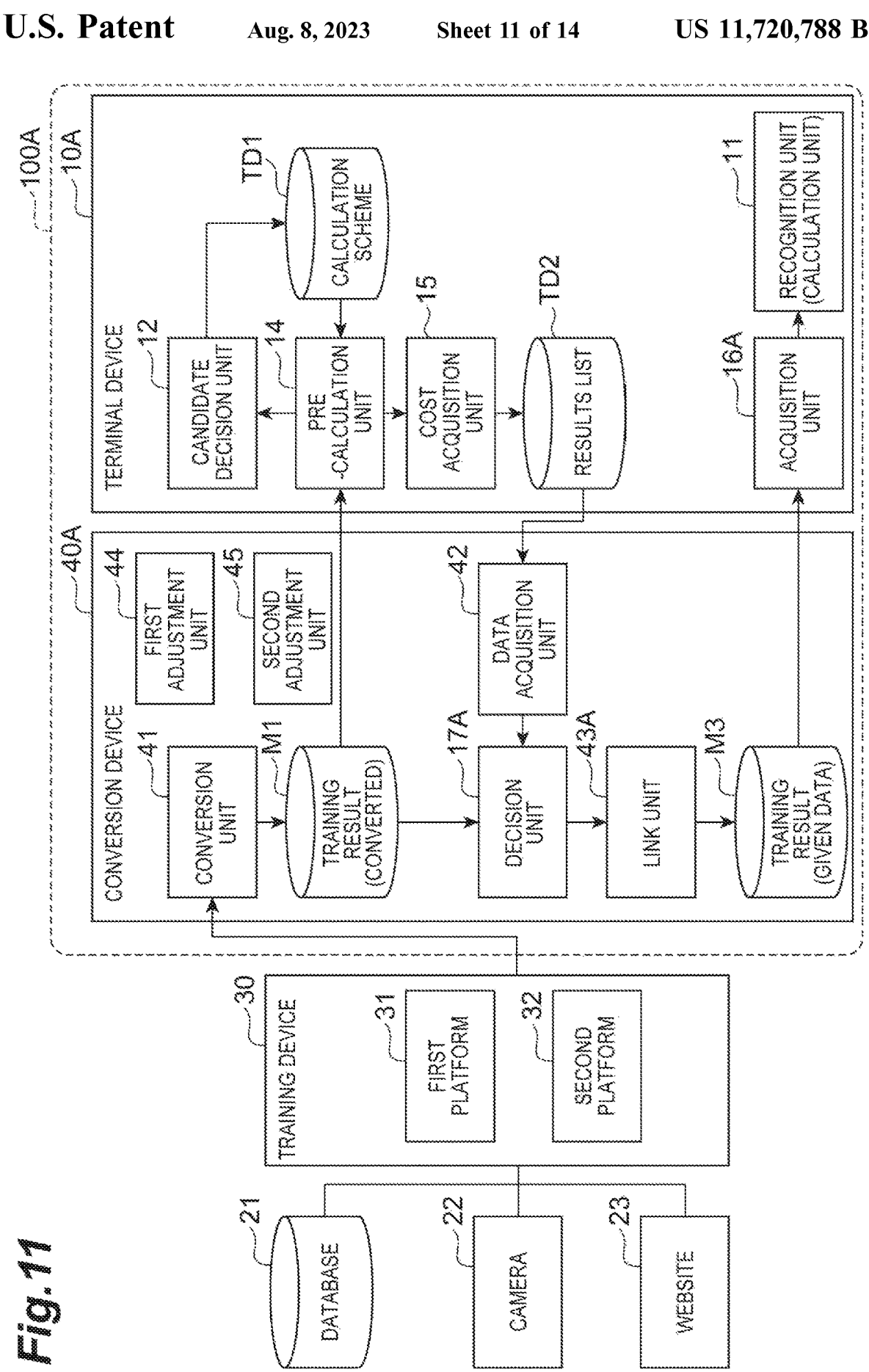
FIG. 11 is a functional block diagram of a calculation scheme decision system according to a second embodiment.

FIG. 11 is a functional block diagram of a calculation scheme decision system 100A according to the second embodiment. As shown in FIG. 11, the calculation scheme decision system 100A includes a conversion device 40A (an example of the calculation scheme decision device) and a terminal device 10A.

The conversion device 40A is different in including a decision unit 17A as compared with the conversion device 40. The decision unit 17A is different in an input source and an output destination and the same as in other configurations as compared with the decision unit 17. In other words, the decision unit 17A selects one calculation scheme for each of the respective layers of the network structure based on the calculation cost from among the calculation schemes prepared in advance for the respective layers based on the results list TD2 to associate the layer of network structure with the selected one calculation scheme.

A link unit 43A gives the correspondence relation associated by the decision unit 17A to the training result M1. In other words, the link unit 43A does not give the results list TD2 as it is to training result M1, but gives the result derived from the results list TD2 to the training result M1. By doing so, a training result M3 is generated.

An acquisition unit 16A is different in acquiring the training result M3 and the same as in other configurations as compared with the acquisition unit 16. In other words, the acquisition unit 16A acquires the network structure, the weight data, and a correspondence relation between the layer of the network structure and the calculation scheme. This allows the recognition unit 11 to use the correspondence relation associated by the decision unit 17A to perform the calculation for each of the respective layers of the network structure on the input data.

Other configurations of the calculation scheme decision system 100A are the same as those of the calculation scheme decision system 100.

(Operation of Calculation Scheme Decision System)

An operation of the calculation scheme decision system 100A is different in the information giving process (FIG. 8) and the calculating process (FIG. 9 and FIG. 10), and the same as in other operations as compared with the operation of the calculation scheme decision system 100.

(Information Giving Process)

Figure 12:
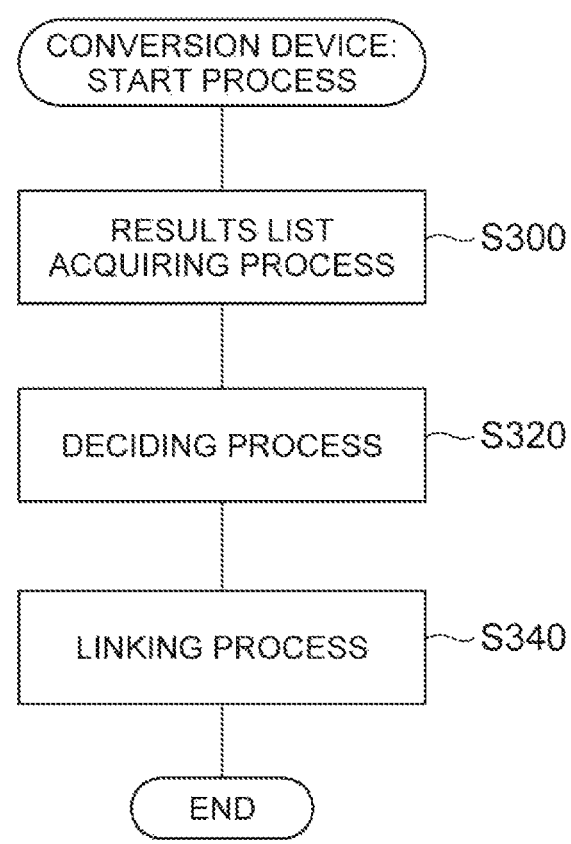
FIG. 12 is a flowchart of an information giving process.

FIG. 12 is a flowchart of an information giving process. The flowchart shown in FIG. 12 is performed by the conversion device 40A.

As shown in FIG. 12, the data acquisition unit 42 in the conversion device 40A acquires the results list TD2 from the terminal device 10, as a results list acquiring process (S300). Subsequently, the decision unit 17A in the conversion device 40 selects one calculation scheme for each of the respective layers of the network structure based on the calculation cost acquired by the data acquisition unit 42, from among the calculation schemes prepared in advance for the respective layers, as a deciding process (S320). Subsequently, the link unit 43 links the training result M1 with one calculation scheme selected for each layer to generate the training result M3, as a linking process (S340). When the linking process (S340) is completed, the flowchart shown in FIG. 12 ends.

The flowchart shown in FIG. 12 is performed so that the training result M3 to which a result of the calculation cost is given is generate.

(Calculating Process)

Figure 13:
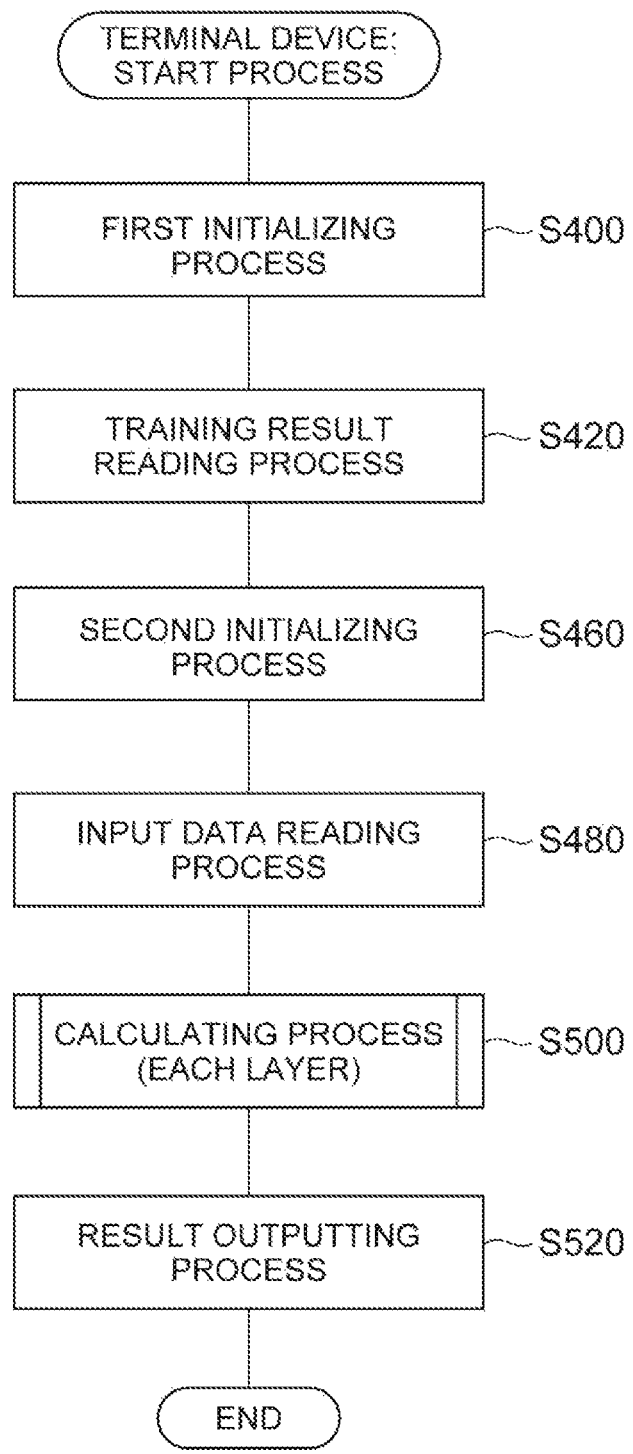
FIG. 13 is a flowchart of a calculating process.

FIG. 13 is a flowchart of a calculating process. The flowchart shown in FIG. 13 is performed by the terminal device 10A.

Figure 14:
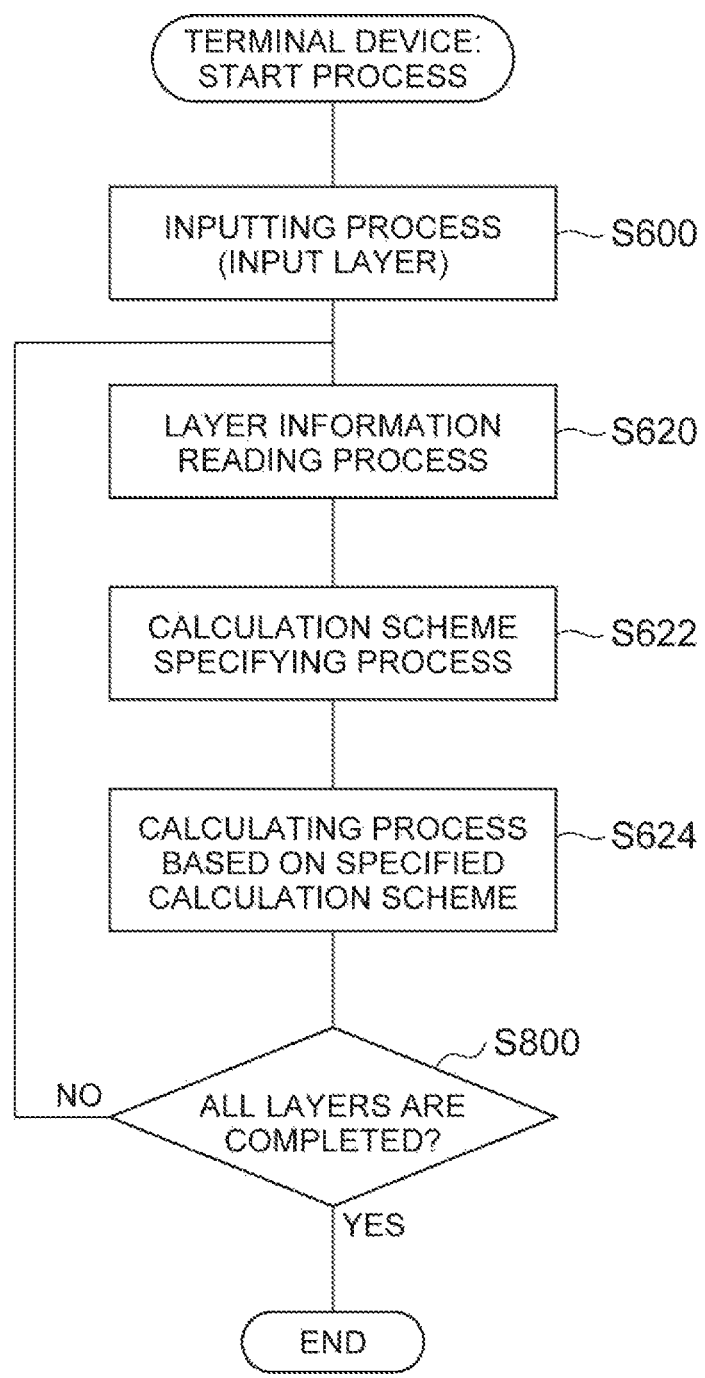
FIG. 14 is a flowchart of a calculating process.

As shown in FIG. 13, the terminal device 10A secures a memory required for the process, as a first initializing process (S400). Subsequently, the recognition unit 11 in the terminal device 10A reads the training result M3 acquired from the conversion device 40A, as a training result reading process (S420). Subsequently, the terminal device 10A secures a memory required for the process, as a second initializing process (S460). Subsequently, the recognition unit 11 inputs data to be identified, as an input data reading process (S480). Subsequently, the recognition unit 11 performs a calculating process for recognition in each layer, as a calculating process (S500). The calculating process (S500) is described later in detail (FIG. 14). Finally, the recognition unit 11 outputs a result of recognition, as a result outputting process (S520), When the result outputting process (S520) is completed, the flowchart shown in FIG. 13 ends.

FIG. 14 is a flowchart of a calculating process. The flowchart shown in FIG. 14 is performed by the terminal device 10A.

As shown in FIG. 14, the recognition unit 11 inputs all pixel values corresponding to one image to the input layer, as an inputting process (S600). Subsequently, the recognition unit 11 inputs information of a layer to be processed, as a layer information reading process (S620). In the information of layer, included is information identifying which layer of the neural network is the layer to be processed. Subsequently, the recognition unit 11 reads the correspondence relation given to the training result M3 to specify the calculation scheme associated with the layer, as a calculation scheme specifying process (S622). Subsequently, the recognition unit 11 performs the calculating process for recognition in the calculation scheme specified in the correspondence relation, as a calculating process (S624).

When the process corresponding to each layer is completed, the recognition unit 11 determines whether or not the process is completed for all layers of the neural network, as a determining process (S800). In a case where the process is determined to be not completed for all layers, the process goes to the layer information reading process (S620) to continue the process on the next layer. In a case that the process is determined to be completed for all layers, the flowchart shown in FIG. 14 ends.

A processing program and a calculation scheme decision program causing to function as the terminal device 10A and the conversion device 40A include modules corresponding to function units of the devices similar to the program described in the first embodiment.

Conclusion of Second Embodiment

In the calculation scheme decision system 100A, one calculation scheme is selected for each layer, from among the calculation schemes prepared in advance, based on the calculation cost obtained by actually operating those calculation schemes in the execution environment. In this way, the calculation scheme decision system 100A can take into account the calculation cost to decide an optimal calculation scheme for each layer. Therefore, the calculation scheme decision system 100A can take into account the calculation cost to decide the calculation scheme.

Note that the present disclosure is not limited to the above embodiments. The present disclosure can be variously modified within a scope not departing from the gist thereof.

The calculation scheme decision system 100 is illustrated to include the terminal device 10 and the conversion device 40 as the hardware, but is not limited thereto. For example, the calculation scheme decision system 100 may be configured as a collection of devices prepared for respective functions connected to each other through a communication network, such as a device for the pre-calculation unit 14, a device for the cost acquisition unit 15, a device for the decision unit 17, and a device for the recognition unit 11. Alternatively, the calculation scheme decision system 100 may be constituted by single hardware capable of exerting the all functions. The calculation scheme decision system 100A may similarly be constituted by various hardware or single hardware.

Since the calculation scheme decision system 100 decides an optimal calculation scheme for each layer for the recognition unit 11, one set of optimal calculation schemes is provided to one recognition unit 11. However, the number of sets of optimal calculation schemes provided is not limited to one, and two or more sets may be provided. In this case, the recognition unit 11 may perform each of a plurality of sets provided to select a set in which the process can be performed the fastest, for example.

The calculation scheme decision system 100 may develop an optimal calculation scheme for another terminal having the same environment. For example, assume that there is a terminal device 10X (an example of a second terminal) having an environment the same as the terminal device 10 (an example of a first terminal). The terminal device 10X is a model the same as the terminal device 10, for example. The calculation scheme decision system 100 may further include a provision unit providing the calculation scheme decided by the decision unit 17 to the terminal device 10X. In this case, the calculation scheme decision system 100 can, without calculating in a terminal in the same environment, apply the calculation scheme decided in another terminal having the same environment.

REFERENCE SIGNS LIST 10, 10A . . . Terminal device, 11 . . . Recognition unit, 12 . . . Candidate decision unit, 14 . . . Pre-calculation unit, 15 . . . Cost acquisition unit, 16, 16A . . . Acquisition unit, 17, 17A . . . Decision unit, 30 . . . Training device, 40, 40A . . . Conversion device, 41 . . . Conversion unit, 42 . . . Data acquisition unit, 43, 43A . . . Link unit, 44 . . . First adjustment unit, 45 . . . Second adjustment unit, 100, 100A . . . Calculation scheme decision system.

The invention claimed is:

1. A calculation scheme decision system comprising:
a pre-calculation unit configured to perform, in an execution environment in which calculation for processing input data is performed using a network structure and weight data, calculation for each of respective layers of the network structure on predetermined data using at least one of calculation schemes prepared in advance for the respective layers of the network structure;
a cost acquisition unit configured to acquire a calculation cost of the at least one calculation scheme for each of the respective layers of the network structure based on a result of the calculation by the pre-calculation unit;
a decision unit configured to select one calculation scheme for each of the respective layers of the network structure based on the calculation cost from among the at least one of the calculation schemes prepared in advance for the respective layers to associate the layer of the network structure with the selected one calculation scheme; and a calculation unit configured to perform the calculation for each of the respective layers of the network structure on the input data in the execution environment using the calculation scheme associated with each layer of the network structure by the decision unit.

2. The calculation scheme decision system according to claim 1, wherein
the at least one calculation scheme includes a plurality of algorithms executable in the execution environment and exerting the same function using arithmetic operations different from each other.

3. The calculation scheme decision system according to claim 1, wherein
the at least one calculation scheme includes a plurality of algorithms executable in the execution environment and performing the same arithmetic operation using resources different from each other.

4. The calculation scheme decision system according to claim 1, further comprising: a candidate decision unit configured to prepare the at least one calculation scheme for each of the respective layers of the network structure based on the execution environment.

5. The calculation scheme decision system according to claim 1, further comprising: a conversion unit configured to acquire the network structure and the weight data from an external device and convert the acquired network structure and weight data into a predetermined format, wherein
the pre-calculation unit and the calculation unit perform calculation based on the network structure and the weight data in the predetermined format converted by the conversion unit.

6. The calculation scheme decision system according to claim 1, further comprising: a first adjustment unit configured to change a data order of the weight data based on the execution environment, wherein
the pre-calculation unit and the calculation unit perform calculation based on the weight data adjusted by the first adjustment unit.

7. The calculation scheme decision system according to claim 1, further comprising: a second adjustment unit configured to perform a preprocess related to the calculation of the calculation unit on the weight data, wherein
the pre-calculation unit and the calculation unit perform calculation based on the weight data adjusted by the second adjustment unit.

8. The calculation scheme decision system according to claim 1, wherein
the pre-calculation unit and the calculation unit are included in a first terminal, and
the calculation scheme decision system further comprises a provision unit configured to provide the calculation scheme decided by the decision unit to a second terminal having an execution environment the same as an execution environment of the first terminal.

9. A calculation scheme decision device comprising:
a data acquisition unit configured to acquire, from a processing device in which calculation for processing input data is performed using a network structure and weight data, a calculation cost in a case of calculating, for each of respective layers of the network structure, in at least one of calculation schemes prepared in advance for the respective layers of the network structure; and a decision unit configured to select one calculation scheme for each of the respective layers of the network structure based on the calculation cost from among the at least one of the calculation schemes prepared in advance for the respective layers to associate the layer of the network structure with the selected one calculation scheme.

10. A method performed by a mobile terminal or a camera, the method comprising:
processing input data with a calculation scheme prepared in advance, wherein the input data is an image and the calculation scheme uses a neural network;
generating a results list in which a layer, a calculation scheme, and an arithmetic operation are associated with each other based on a time required for calculation and a memory resource required for calculation;
specifying, based on the results list, a calculation scheme, for each layer, of which a calculation cost is the smallest;
performing the calculation for each of the respective layers of the network structure on the input data in the execution environment using the calculation scheme; and
outputting a recognition result, wherein the recognition result includes an estimate of a content of the image.

11. A calculation scheme decision method comprising:
acquiring, from a processing device in which calculation for processing input data is performed using a network structure and weight data, a calculation cost in a case of calculating, for each of respective layers of the network structure, in at least one of calculation schemes prepared in advance for the respective layers of the network structure; and
selecting one calculation scheme for each of the respective layers of the network structure based on the calculation cost from among the at least one of the calculation schemes prepared in advance for the respective layers to associate the layer of the network structure with the selected one calculation scheme.

12. A non-transitory computer readable storage medium for storing a calculation scheme decision program causing a computer to operate,
the program causing the computer to function as:
a pre-calculation unit configured to perform, in an execution environment in which calculation for processing input data is performed using a network structure and weight data, calculation for each of respective layers of the network structure on predetermined data using at least one of calculation schemes prepared in advance for the respective layers of the network structure;
a cost acquisition unit configured to acquire a calculation cost of the at least one calculation scheme for each of the respective layers of the network structure based on a result of the calculation by the pre-calculation unit;
a decision unit configured to select one calculation scheme for each of the respective layers of the network structure based on the calculation cost from among the at least one of the calculation schemes prepared in advance for the respective layers to associate the layer of the network structure with the selected one calculation scheme; and
a calculation unit configured to perform the calculation for each of the respective layers of the network structure on the input data in the execution environment using the calculation scheme associated with each layer of the network structure by the decision unit.

13. A non-transitory computer readable storage medium for storing a calculation scheme decision program causing a computer to operate, the program causing the computer to function as:
- a data acquisition unit configured to acquire, from a processing device in which calculation for processing input data is performed using a network structure and weight data, a calculation cost in a case of calculating, for each of respective layers of the network structure, in at least one of calculation schemes prepared in advance for the respective layers of the network structure; and
- a decision unit configured to select one calculation scheme for each of the respective layers of the network structure based on the calculation cost from among the at least one of the calculation schemes prepared in advance for the respective layers to associate the layer of the network structure with the selected one calculation scheme.

* * * * *